No. 827,709. PATENTED AUG. 7, 1906.
A. C. CHASE.
NEST FOR POULTRY.
APPLICATION FILED FEB. 23, 1906.
3 SHEETS—SHEET 2.
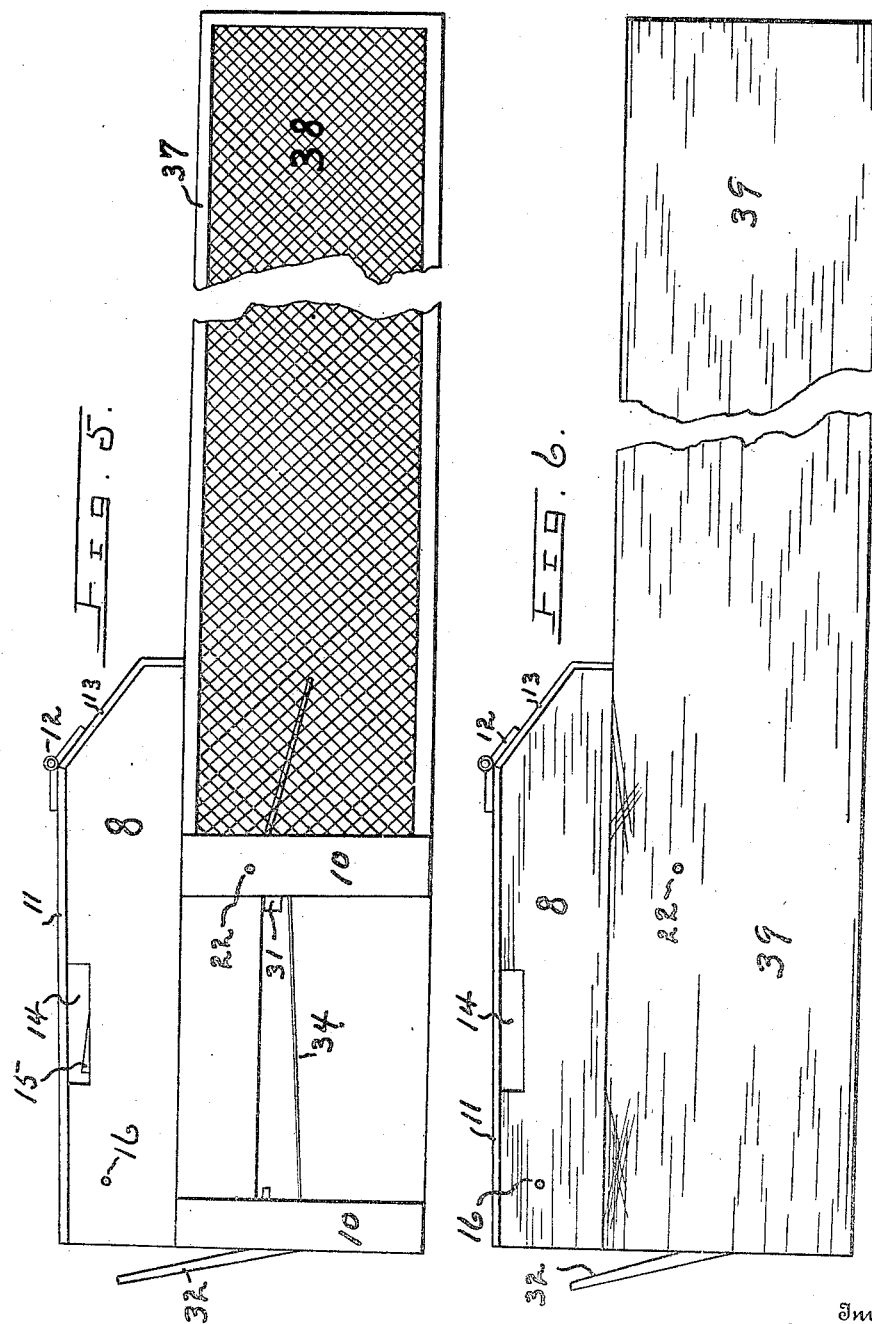

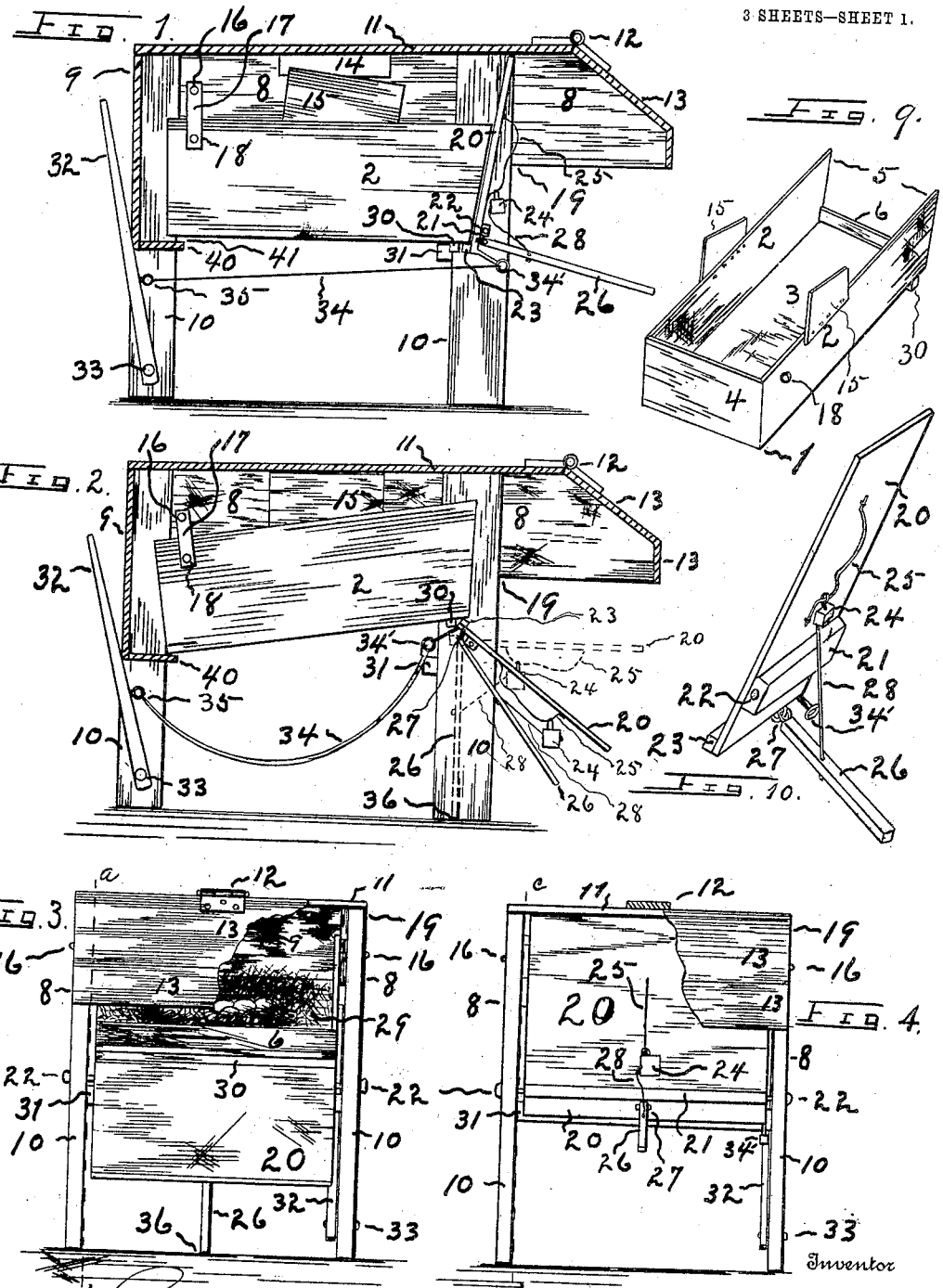

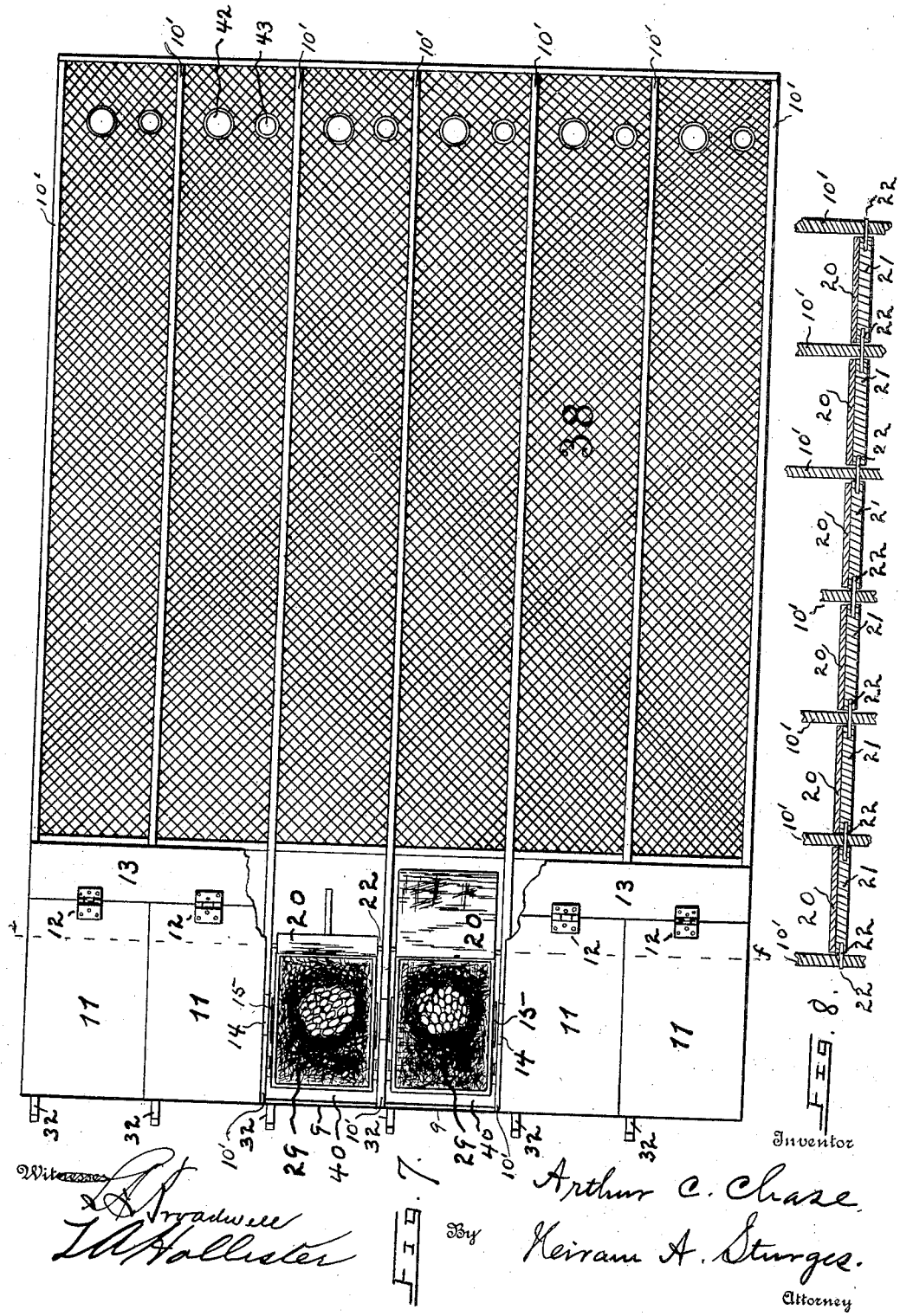

UNITED STATES PATENT OFFICE.

ARTHUR C. CHASE, OF OMAHA, NEBRASKA.

NEST FOR POULTRY.

No. 827,709.

Specification of Letters Patent.

Patented Aug. 7, 1906.

Application filed February 23, 1906. Serial No. 302,410.

*To all whom it may concern:*

Be it known that I, ARTHUR C. CHASE, a citizen of the United States, residing at Omaha, in the county of Douglas and State of Nebraska, have invented certain new and useful Improvements in Nests for Poultry, of which the following is a specification.

My invention relates to improvements in nests for poultry of the class adapted to afford separate shelter in poultry raising to the mother hen during the period of incubation.

The object of the invention is to provide a means for the housing, feeding, and confinement of sitting-fowls during the hatching period in a manner so that the fowl cannot leave her nest, as for feeding or exercise, until released by the operator, and a construction so that the hatching-box is locked by the hen reëntering the nest, thereby requiring no attention from the poultryman, the closing of the hatching-box being caused by the weight of the hen added to that of the box.

The invention also has reference to a means for controlling ventilation, the presentation of a series of hatching-nests as well as single, the employment of feeding-yards having sides constructed of wire-netting as well as of continuous lumber construction, and a system of pivotal mounting for drop-doors found to be economical.

The novel means employed are fully described herein and clearly illustrated by the drawings, wherein—

Figure 1 represents a sectional elevation on line *c d* of Fig. 4, showing the nest-box closed. Fig. 2 is a sectional elevation on line *a b* of Fig. 3, showing the nest-box open. Fig. 3 is a vertical front view of the housing-box with open oscillating hatching-box mounted therein, a part of the deck being torn away to show the interior. Fig. 4 is a somewhat similar view to that shown by Fig. 3, the drop-door being closed. Figs. 5 and 6 are side elevations showing adaptability of the invention in connection with confining yards having sides, respectively, of wire or of boards. Fig. 7 represents a plan view of a series of housed nests and feeding-yards attached, a part of the covering of the housing-boxes being removed to show interior arrangement. Fig. 8 represents a sectional view on line *e f* of Fig. 7, introduced to illustrate a method for mounting pivotally the several drop-doors. Fig. 9 represents a perspective view of the hatching-box, and Fig. 10 is a perspective view of the drop-door and parts belonging thereto.

I construct a rectangularly-formed nest-receptacle or hatching-box 1, Fig. 9, having the sides 2, bottom 3, a closed end 4, and the open space 5 at the opposite end, said box being adapted to contain the eggs to be hatched, and provide the front dash 6 to properly retain the nest and contents, and I provide a housing or sheltering box 19, having the sides 8 and end 9, rigidly supported upon legs 10, and provide the slightly-inclined cover or roof 11, which is hinged at 12 upon the extended deck 13.

The sides 8 are cut out to form the openings 14, Figs. 1, 5, and 6, and rigidly upon the sides 2 of hatching-box 1 are fastened leaves 15, and upon sides 8 of the housing-box I pivotally mount at 16 the straps 17.

The nest-box 1 is seated within housing-box 19, the sides 2 being pivotally mounted at 18 upon straps 17, and as thus constructed the weight of one end of box 1 is sustained by straps 17, and on occasion the box is adapted to have a slight rotative and a lengthwise movement on this pivotal mounting, the weight of the opposite end being sustained in a manner presently described.

The drop-door 20 is constructed, preferably, as a thin leaf, so as to be of light weight, and rigidly and transversely upon the outer side of this door is fastened the reinforcing-block 21, having a pivotal mounting 22 upon legs 10 of the housing-box, and rigidly upon the inner side of the drop-door, at the end thereof, is fastened the lug 23.

I provide a small weight 24, slidably mounted upon the guide-rail 25, the guide-rail being rigidly mounted upon the trap-door and disposed substantially parallel with the ends of said door, and I provide a supporting-rod 26, hingably mounted at 27 upon the inner edge of door 20, said rod 26 having a specific length, so that it may reach from the door to the ground when the door and supporting-rod occupy the positions shown by broken lines in Fig. 2, and I employ a flexible member, as the cord 28, of a suitable length and therewith connect the weight with the supporting-rod 26. Across one end upon the bottom of the nest-box 1 is rigidly fastened the cleat or lug 30, and beneath the box is fastened rigidly upon legs 10 the supporting-bar 31. It will be readily understood by an examination of Figs. 1 and 4 that guide-rail 25 is in a substantially vertical position upon door 20 when said door is closed, the supporting-rod 26 at this time extending outwardly and free from the ground and sustained in this position by cord 28, attached to weight 24, and weight 24, actuated by gravity, is adapted to slide freely upon the guide-rail to the opposite end thereof on occasion and by reason of this sliding movement controls the positions of supporting-rod 26, (shown in solid lines in Figs. 1 and 2,) the function of this rod 26 being presently explained.

It will be understood, of course, that box 1 is adapted to contain the nest 29 and when mounted as shown by Fig. 1 affords a shelter for the sitting hen during the period of incubation. I will now proceed to point out more fully the uses and operation of parts. The door 20 will remain in a closed position when the parts are disposed as shown by Fig. 1, since the weight of the sitting hen and nest added to the weight of box 1 collectively rest upon cleat or lug 23, thereby causing the door to preserve a closure of the front space between sides 8, and the fowl is therefore confined upon the nest and is entirely under control of the operator, this feature being of advantage, since it is desirable that the hatching process shall continue with the fewest possible interruptions and that the habits of the fowl be under control. For purposes of this control I employ devices now to be described.

I provide a hand-lever 32, Figs. 1 and 2, pivotally mounted at 33 near the bottom of one of legs 10 beneath end 9 of the housing-box, and rigidly mount upon the bottom of door 20 the lever-arm 34' and employ a flexible member, as the cord 34, fastened to lever 32 in any convenient manner, as by eyebolt 35, the opposite end of cord 34 being connected to the end of lever-arm 34', and at feeding time the poultryman forcibly and partly rotates lever 32 on its pivotal mounting, which causes door 20 to swing forward and downward as far as indicated by the broken lines shown in Fig. 2, the supporting-rod by this movement of said lever being thrown to a position substantially vertical, one end of this rod resting upon the ground at 36, as shown by broken lines in Fig. 2, the weight 24 at this time still resting upon the inner end of guide-rail 25. The function above referred to of supporting-rod 36 is here plainly apparent, since its lower end rests upon the ground, and it operates to sustain door 20 in a substantially horizontal position and to remain in this position until the hen passes out of the nest and housing-box. In passing out of the housing-box the fowl will cause door 20 to swing somewhat farther downward while passing under deck 13, this deck being purposely built in a manner so that her weight while passing out will come upon the door, thereby causing said door and parts attached thereto to be positioned as shown by the full lines in Fig. 2.

The advantages of the invention for use in the control of the sitting hen in poultry raising will be readily apparent to those familiar with devices of this class. The parts are simple but certain in operation. When the poultryman rotates lever 32, the door 20 and supporting-rod 26 immediately assume the positions shown by broken lines in Fig. 2, and these parts will remain in the position thus indicated until the hen leaves the nest, since, as above stated, supporting-rod 26 rests upon the ground, as at 36, the weight of the nest-box and fowl being supported at this time by this rod, and the act of the poultryman in rotating lever 32 may be said to "lock" the parts in this position, and by an examination of Figs. 1 and 2 it will be seen that it remains to the fowl herself to unlock the parts when she leaves the box. Generally the fowl will at once leave the nest-box when the poultryman thus partly lowers door 20; but she may remain upon the nest. Finally, induced by hunger, she will leave the nest. The deck 13 is formed so that in leaving the box the fowl must come in contact with the upper surface of door 20, and the door by reason of her added weight is moved or rotated downward, as above stated, from the position of parts shown by broken lines to the position of parts shown by the solid lines, and as this movement causes weight 24 to slide downward upon guide-rail 25 said weight carries with it cord 28 and causes supporting-rod 26 to be raised from the ground, and the parts will remain in this position, as shown by solid lines, Fig. 2, until the fowl returns to the nest.

For feeding purposes I provide a yard suitably inclosed by the frame 37, Fig. 5, and wire-netting 38, and I may and preferably will build the yard having sides constructed of a single board, as shown by the numeral 39, Fig. 6, which is economical and operates as a complete substitute for the legs 10.

Upon returning to her nest the weight of the sitting hen causes a part rotation of box 1 upon the pivotal mountings 16 and 18, and as the box swings backward the front end is lowered until the nest-box rests in the position shown by Fig. 1. The box during this lowering movement is at all times in contact with lug 23, and as lug 23 is pressed downward in this manner it follows that door 20 will be raised, and it is evident that the weight of the fowl causes an automatic rotating movement of the door as she comes upon her nest. The fowl is thereupon confined until again released by the poultryman, having automatically "locked" herself within the box.

The back 9 of the housing-box is transversely extended to form the inwardly-projecting shelf 40, and during confinement of the fowl in the nest a recess 41 is formed between this shelf and the lower surface of the box operating as an air-passage, and the apertures 14 also remain open during this time for purposes of ventilation, Fig. 1. It will be noted that these openings are closed while the fowl is away from the nest by the leaves 15, thereby preventing air-drafts from passing through the box to unduly cool the eggs during that period.

I find it economical to construct several hatching-nests and join them as a series by use of the vertically-disposed boards 10', Fig. 7, as partitions, and Fig. 7 represents a correct view of such series. According to this construction as a series the vertically-disposed partitions 10' furnish the pivotal mounting for levers 32 and for drop-doors 20 and, as elsewhere stated, dispense with the leg construction. A convenient method for the mounting of pivots 22 for the series of drop-doors is shown by Fig. 8, where, as is apparent, one headless pin 22 passes through each partition and pivotally sustains the reinforcing member 21, upon which the drop-door is mounted, and is a very convenient and effective construction. The ventilation system by means of openings 14 and leaves 15 is an advantage in the adaptation of the invention as a series, since the ports 14 extend as one line of openings throughout the width of the structure. The top of each yard is provided with wire-netting 38 and apertures 42 and 43 are provided for furnishing food and water.

The devices herein described have been used one season, and the construction found to be quite inexpensive. The invention proves effective for confining and sheltering the fowl during the incubation period and for exercising the control, as explained. The parts operate automatically where such action is most needed, and it is believed the improved method of ventilation will be found of advantage.

What I claim as my invention is—

1. A nest-box for poultry, in combination, comprising an outer and inner receptacle, a door pivotally mounted upon said outer receptacle and having a guide-rail and a rigidly-mounted lever-arm thereon; a weight slidably mounted upon said guide-rail, a supporting-rod hingably mounted on said door and connected with said weight, and mechanism adapted to cause a downward swinging movement of said rigidly-mounted lever and hingably-mounted supporting-rod.

2. A nest-box for poultry, in combination, comprising an outer receptacle; an inner receptacle pivotally mounted and adapted to have a downward-swinging movement within said outer receptacle and having a lower surface and an open end space; a door pivotally mounted upon said outer receptacle and having its inner edge in contact with the lower surface of said inner receptacle; said door adapted to make a closure of the open end space of said inner receptacle from said downward-swinging movement of said inner receptacle.

3. A nest-box for poultry as described, comprising an outer receptacle having an open end space and apertures formed in its sides, a deck formed upon said outer receptacle adjacent to said open end space; an inner receptacle pivotally mounted within said outer receptacle and having upwardly-extending leaves formed thereon; said upwardly-extending leaves upon said inner receptacle adapted to make a closure of the apertures formed in the sides of said outer receptacle, a pivotally-mounted door upon said outer receptacle, a rigidly-mounted lever-arm upon said door; said pivotally-mounted door adapted to have a downward-swinging movement by actuation of said rigidly-mounted lever-arm, and means to actuate said rigidly-mounted lever-arm.

4. A nest-box for poultry, comprising a first receptacle, a second receptacle pivotally mounted within the first receptacle, a door pivotally mounted upon the first receptacle and having a rigidly-mounted lever-arm thereon; a guide-rail mounted on said door, a weight slidably mounted upon said guide-rail, a supporting-rod hingably mounted upon said door and connected with said weight; said door and supporting-rod adapted to have a downward-swinging movement from actuation of said rigidly-mounted lever-arm on said door, and means to actuate said rigidly-mounted lever-arm.

5. The herein-described nest-box for poultry, consisting of an outer receptacle having an open end space and an extended deck; an inner receptacle pivotally mounted within said outer receptacle and having a lower surface and an open end space; a door pivotally mounted upon said outer receptacle having its inner edge in contact with the lower surface of said inner receptacle; a rigidly-mounted lever-arm upon said door; said door adapted to have a downward-swinging movement under actuation of said rigidly-mounted lever-arm upon said door, and means to actuate said rigidly-mounted lever-arm.

6. In a nest-box for poultry, the combination of an outer receptacle, an inner receptacle pivotally mounted and adapted to have a downward-swinging movement within said outer receptacle and having a lower surface and an open end space; a door pivotally mounted upon said outer receptacle and having an inner edge in contact with the lower surface of said inner receptacle and having an outwardly-extending lever-arm thereon; a supporting-rod; an operating-lever; a guide-rail mounted upon said door, a weight slidably mounted upon said guide-rail; said supporting-rod hingably mounted upon said door and connected with said weight; said operating-lever connected with the outwardly-extending lever-arm upon said door and adapted to cause a downward-swinging movement of said door to substantially a horizontal position and to cause a downward-swinging movement of said hingably-mounted supporting-rod to substantially a vertical position; the slidable weight adapted to have a lengthwise movement on said guide-rail to cause a reverse swinging movement of said supporting-rod from said substantially vertical position; said door adapted to make a closure of the open end space of said inner receptacle by the downward-swinging movement of said inner receptacle.

7. The herein-described nest-box for poultry, consisting of a series of outer receptacles having side walls cut away to form ventilating-ports; a series of doors mounted upon pivots 22 on the side walls of said outer receptacle each having an outwardly-extending lever-arm mounted thereon; an inner receptacle pivotally mounted within each of said outer receptacles and having upwardly-extending leaves; said upwardly-extending leaves upon said inner receptacles adapted to make a closure of said ventilating-ports; each of said doors adapted to have a downward-swinging movement by actuation of the outwardly-extending lever-arm mounted thereon, and means to actuate each of said outwardly-extending lever-arms.

In testimony whereof I affix my signature in presence of two witnesses.

ARTHUR C. CHASE.

Witnesses:
C. E. LATSHAW,
H. A. STURGES.